United States Patent
Frost et al.

(10) Patent No.: US 11,186,183 B2
(45) Date of Patent: Nov. 30, 2021

(54) BATTERY CARRIER WITH A PERIPHERAL FRAME AND ADHESIVE GAP SET IN A DEFINED MANNER

(71) Applicant: BENTELER AUTOMOBILTECHNIK GMBH, Paderborn (DE)

(72) Inventors: Georg Frost, Steinheim (DE); Thomas Guenther, Paderborn (DE); Christian Handing, Langenberg (DE); Frank Rabe, Hiddenhausen (DE); Peter Summerauer, Paderborn (DE); Ludger Gehringhoff, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 123 days.

(21) Appl. No.: 16/706,580

(22) Filed: Dec. 6, 2019

(65) Prior Publication Data
US 2020/0180443 A1 Jun. 11, 2020

(30) Foreign Application Priority Data
Dec. 7, 2018 (DE) ..................... 10 2018 131 376.4

(51) Int. Cl.
*B60K 1/04* (2019.01)
*B60L 50/64* (2019.01)
*B60L 58/26* (2019.01)
*B62D 21/15* (2006.01)
*B23K 11/087* (2006.01)
*H01M 50/20* (2021.01)

(52) U.S. Cl.
CPC ............ *B60L 50/64* (2019.02); *B23K 11/087* (2013.01); *B60K 1/04* (2013.01); *B60L 58/26* (2019.02); *B62D 21/157* (2013.01); *H01M 50/20* (2021.01); *B60K 2001/0438* (2013.01); *B60Y 2306/01* (2013.01); *H01M 2220/20* (2013.01)

(58) Field of Classification Search
CPC ........... B60L 50/64; B60L 50/66; B60K 1/04; H01M 50/20; B62D 21/15
See application file for complete search history.

(56) References Cited

U.S. PATENT DOCUMENTS

| 2015/0236314 A1* | 8/2015 | Lee | ...................... H01M 10/625 429/120 |
| 2016/0263639 A1* | 9/2016 | Yoshida | ................. B65D 5/242 |

FOREIGN PATENT DOCUMENTS

JP 2015230891 A 12/2015

OTHER PUBLICATIONS

Office Action for German Application No. 10 2018 131 376.4 dated Nov. 22, 2019; 11pp.

* cited by examiner

*Primary Examiner* — James A Shriver, II
*Assistant Examiner* — James J Triggs
(74) *Attorney, Agent, or Firm* — Hauptman Ham, LLP

(57) ABSTRACT

Battery carrier for an electric motor vehicle, having a trough formed by a base and a peripheral frame coupled to the base, wherein the frame is formed from extruded hollow profiles and a cover is arranged on the frame. In the installation position, the frame has a web protruding in each case in relation to its upper side and/or lower side in such a manner that a defined gap with respect to the base and/or with respect to the cover is produced, with a sealant and/or adhesive being incorporated.

16 Claims, 19 Drawing Sheets

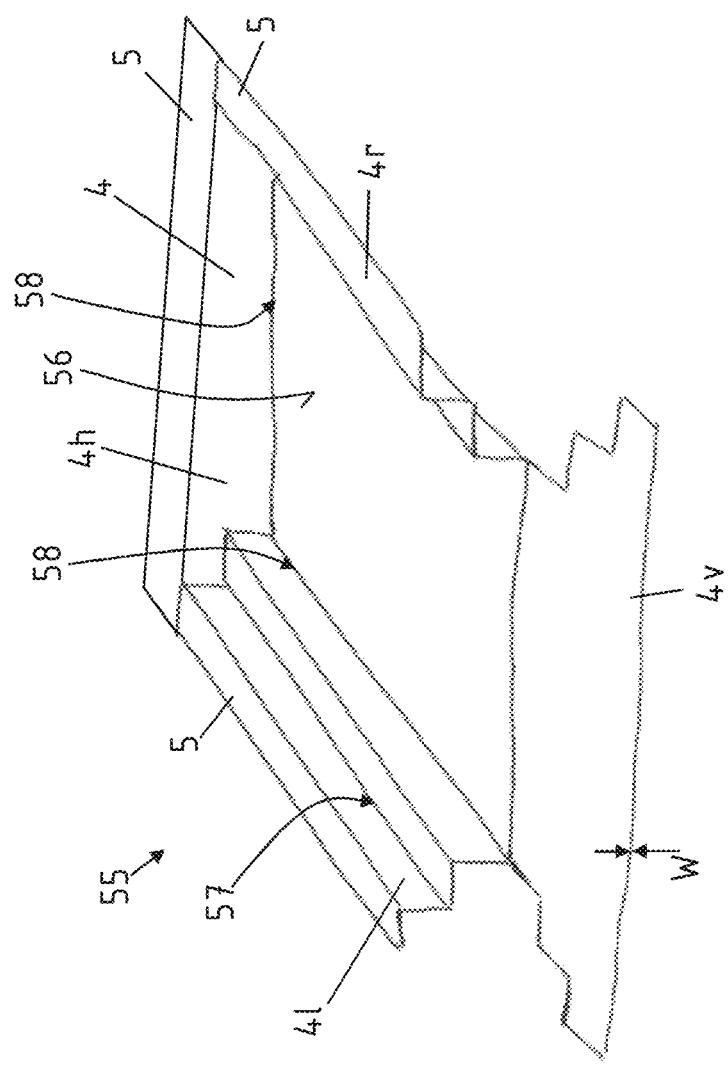

BATTERY CARRIER WITH A PERIPHERAL FRAME AND ADHESIVE GAP SET IN A DEFINED MANNER

RELATED APPLICATIONS

The present application claims priority to German Application Number 10 2018 131 376.4 filed Dec. 7, 2018, the disclosure of which is hereby incorporated by reference herein in its entirety.

The present invention relates to a battery carrier for an electric motor vehicle according to the features in claim 1.

Electric mobility has become increasingly relevant in the use of motor vehicles. This involves electric motor vehicles being driven exclusively by electrical energy. The storage of said electrical energy in the electric motor vehicle requires batteries, also called rechargeable batteries, high-voltage batteries or traction batteries, which take up a considerable amount of volume and have a relatively high inherent weight. So that a sufficient amount of energy, for example for reaching a range of 300 km with one battery charge, can be stored, such batteries are arranged in the underfloor region of a motor vehicle. The batteries themselves are accommodated in a battery carrier such that, firstly, they are protected against external weather influences and, secondly, an escape of substances contained in the batteries to the environment is avoided.

To this end, battery housings which are produced from plastics materials, fiber composite materials or else from metallic materials are known from the prior art. The battery carriers are also referred to as a battery tray.

Such a battery housing is generally mounted on a motor vehicle from below and extends decisively over a large part of the motor vehicle width and also over part of the motor vehicle length.

The battery housing consists essentially of a battery carrier and a housing cover.

A battery carrier is distinguished by a trough-shaped housing in which a plurality of batteries are arranged. So that sufficient rigidity of the battery carrier is ensured, a frame consisting of a hollow profile, which can also act at the same time as a peripheral wall of the trough, is arranged peripherally on the outside. A battery carrier is arranged in the non-visible underfloor region of the motor vehicle. There are exacting requirements in respect of tightness and of production tolerances. However, the production costs of the battery carrier are subject to a massive cost pressure.

The trough-shaped battery carrier of a battery housing is sometimes produced as a sheet-metal formed component. A document forming the generic type in this respect is US 2016/0263639 A1.

However, problems arise in this case in the corner regions in respect of the degrees of forming during the forming by bending or deep-drawing, but also in respect of the tightness to be achieved.

It is the object of the present invention to provide a battery carrier which is improved in respect of its manufacturing outlay in relation to battery carriers known from the prior art.

The battery carrier is for an electric motor vehicle and has a trough. The trough is formed by a base and a peripheral frame coupled to the base, wherein the frame is formed from extruded hollow profiles and a cover is arranged on the frame. According to the invention, the frame is furthermore distinguished in that, in the installation position, it has a web protruding in each case in relation to its upper side and/or lower side in such a manner that a defined gap with respect to the base and/or the cover is produced, with a sealant and/or adhesive being incorporated.

The frame is produced in particular from extruded or roll-shaped hollow profiles, in particular from a light metal alloy, preferably an aluminum alloy; these also being called frame profiles below. For this purpose, the hollow profile is cut to length to form individual profile pieces. In the case of a battery carrier which is square in top view, four frame profile pieces are therefore arranged laterally peripherally. Alternatively, however, the frame can also be formed from one or more hollow profiles which are bent in at least one corner.

The frame profiles are preferably rectangular or square in cross section. An upper side and a lower side is thus provided in the installation situation. The base, in particular in the form of a base plate, is coupled to the lower side. The cover, in particular a flange of the cover, is coupled to the upper side.

So that the interior space of the battery carrier is now made tight in relation to the surroundings, during the initial assembly the frame is coupled to the base, with a sealing material being incorporated. Alternatively or additionally, the frame can also be adhesively bonded to the base, with an adhesive being incorporated. It is also possible for both an adhesive and a sealant to be used. The same applies to the upper side and thus coupling of frame and cover.

So that sealing material and/or adhesive does not now escape in an uncontrolled manner or is not pushed away unintentionally by bringing together the surfaces during the assembly, it is provided according to the invention that a web protruding in each case in relation to the upper side and/or a web protruding in relation to the lower side is formed on the frame profile. The web therefore serves as a spacer. The web is designed in particular as an extension of the outer side of the frame profiles, and it therefore simultaneously increases the outwardly directed surface and ensures that excessive sealing material and/or adhesive escapes inwards and forms a seal. The height of the web in relation to the upper side or lower side also, as it were, defines the height of a gap; a defined gap is therefore produced. The height of the web is in particular 0.2 to 5 mm, preferably 0.5 to 4 mm, particularly preferably 1 to 3 mm. If a sealing material is therefore applied to the lower side of the frame and the frame is coupled, for example screwed, to the base, the base plate comes to lie against the web, but is not pressed further onto the lower side. The sealing material and/or adhesive remains in the gap which is thus produced, and a targeted, added excess during the application enables the adhesive to be distributed in the gap and therefore to reliably bring about the tightness of the battery housing produced in this way.

All of the explanations made with regard to the coupling of frame and base also apply independently thereof to the coupling of frame and cover.

The battery carrier according to the invention is produced in particular as an assembled battery carrier. The trough in particular is assembled here and is not produced, as known from the prior art, by a deep-drawing method or other method, but rather by coupling of base plate to frame, as a result of which the trough is formed.

The battery carrier is constructed modularly in such a manner that further layers, in particular functional layers, are coupled to the trough. It is therefore provided in particular that a cooling system is arranged under the base plate in the installation position.

The batteries arranged in the trough in particular stand on the base plate. Possible production of heat in the batteries is therefore dissipated by heat conduction to the base plate and removed by the cooling system arranged below the base plate.

For better heat conduction, a heat-conducting paste or heat-conducting foil can be arranged extensively between batteries and base plate.

Within the scope of the invention, in certain operating states the cooling system can also serve as a heating system, in particular prior to setting off at a very low outside temperature. Cooling system and heating system in this respect constitute a heat exchanger.

The cooling system is designed in particular in such a manner that a cooling duct plate is arranged below the base plate such that a cooling duct system is formed between base plate and cooling duct plate. A cooling medium, for example a fluid medium or else a cooling gas, can then be conducted through the cooling duct system and can therefore remove the heat conducted out of the batteries via the base.

Base plate and cooling plate can also be formed as a sheet-metal assembly, for example by a roll-bonding process followed by internal pressure forming of the cooling duct structure.

Furthermore, a cover can be arranged on the frame, wherein the cover preferably has a peripheral, laterally protruding flange. The flange itself then preferably rests on the frame or on the upper side of the frame and in particular, according to the invention, on the web such that, in turn, a sealant and/or adhesive is incorporated between upper side of the frame and flange of the cover. The cover can be, for example, screwed to the frame or else coupled to the frame in another manner.

The frame itself is preferably formed from a plurality of frame profiles. These are preferably at least four frame profiles, one being the upper side, one the rear side, one the left side and one the right side. In the case of a trapezoidal or else polygonal battery carrier, more frame profile pieces are correspondingly installed. The frame profile pieces are coupled to one another in the arising corner regions. For this purpose, in particular, the frame profiles are welded to one another. According to the invention, two advantageous coupling variants have emerged in this regard. Firstly, the frame profiles can be cut with a miter and then joined thermally to one another, for example by flash spot welding.

However, it has been shown to be furthermore advantageous if a frame profile has a notch which is produced, for example, by machining. The other frame profile is then inserted engaging in the notch. In particular the peripheral wall on the outside is, however, formed continuously as far as the corner in both frame profiles. Both frame profiles are then preferably coupled to each other, in particular by joining in an integrally bonded manner. This is in particular welding. The entire cross section is preferably welded together peripherally in the corner region.

Mounting holders are preferably arranged in the frame itself, i.e. towards the interior space of the battery carrier, for coupling to the batteries. The mounting holders can be, for example, themselves extruded components and can be coupled to the frame, for example, in turn, by joining in an integrally bonded manner.

Therefore, first of all, the frame can be produced, then can be coupled to the base plate and, subsequently, the batteries can be mounted in the resulting trough. The latter can then, in turn, be closed by the cover.

Furthermore advantageously, at least the two laterally outer frame profiles, consequently on the left and the right side of the vehicle, are formed in cross section in such a manner that they have grooves and/or predetermined buckling points. The frame can therefore act as a crash box during a side impact. The frame is therefore deformed in cross section, for example during a side impact or pole test, and, in the process, converts impact energy into deformation work.

Further advantages, features, properties and aspects of the present invention are the subject matter of the description below. Preferred embodiments serve for simple understanding of the invention. In the drawings:

FIG. 1 shows a battery carrier according to the invention in a perspective view, FIG. 2 shows a longitudinal section along the intersecting line II-II from FIG. 1, FIG. 3 shows a cross-sectional view according to the intersecting line III-III from FIG. 1, FIGS. 4 to 7 show a respective exploded illustration during the assembly operation of a battery carrier according to the invention, FIG. 8 shows a perspective and combined sectional view of the base plate with frame placed thereon and hollow profiles arranged therebelow, FIG. 9 shows a detailed cross-sectional view of an edge region through a battery carrier according to the invention, FIGS. 10 to 14 show the production of a welded connection in a corner region with an optional sealing bead, FIG. 15 shows a hood produced according to the invention, FIG. 16 shows a hood produced according to the invention with an additional step in a side wall, FIG. 17 shows a longitudinal sectional view according to the intersecting line A-A from FIG. 16, FIG. 18 shows an alternative variant embodiment of a hood according to the invention, FIGS. 19*a* to 19*f* show various cross-sectional views of the peripheral frame, FIG. 20 shows a perspective view of a battery carrier from below, FIG. 21 shows a detailed view of a battery carrier from below with a heat protection plate, FIG. 22 shows the production of a trough as a folded trough with a step integrated in the side wall.

In the figures, the same reference signs are used for identical or similar components even if a repeated description is omitted for simplification reasons.

FIG. 1 shows a battery carrier 1 according to the invention in a perspective view. The battery carrier 1 has a hood 2 lying at the top with respect to the vertical direction Z of the motor vehicle. The hood 2 itself has a base 3 and a peripheral side wall 4 and a flange 5 protruding in relation to the side wall 4. The hood 2 therefore engages over a peripheral frame 6, wherein the frame 6 rests on a base plate 7. Hollow profiles 8 are arranged below the base plate 7. The hollow profiles 8 run substantially in the transverse direction Y of the motor vehicle and cover the battery carrier extensively from below. In the center, the hollow profiles 8 can likewise be interrupted by a central profile 9. Below the central profile 9, for example, an exhaust train, not illustrated specifically, can be arranged in a recessed region 10. Fastening clips 11 are arranged laterally. The fastening clips 11 themselves can be produced, for example, as extruded profile components or else cast components. The fastening clips 11 themselves are in particular screwed to the battery carrier 1 and serve for the coupling to a vehicle, not illustrated specifically. Screw connections 12 provided for this purpose are then coupled to the peripheral frame 6.

FIG. 2 shows a longitudinal section along the intersecting line II-II from FIG. 1. It can be seen here that the hood 2 is designed as a formed component with the base 3, the peripheral side wall 4 and a flange 5 peripherally protruding in turn from the side wall 4. In addition, the flange 5 has a step 14 or fold which is formed oriented protruding substantially by 90° in relation to the flange 5. Batteries 16, indicated schematically, are arranged in an interior space 15 of the battery carrier 1. The batteries 16 stand on a base plate 7. A cooling duct plate 17 is arranged below the base plate 7, with respect to the vertical direction Z of the motor vehicle. The cooling duct plate 17 has formations 18 in such a manner that cooling ducts 19 for conducting a fluid are formed between base plate 7 and cooling duct plate 17. The batteries 16 arranged on the base plate 7 therefore output heat produced to the base plate 7, said heat, in turn, being removed by the cooling medium in the cooling ducts 19. The base plate 7 itself is then coupled to the frame 6. The frame 6 itself has a spacing boss 20 in each case at the bottom and top. A gap 21 arising between frame 6 and base plate 7 can therefore be filled with additional sealant and/or adhesive. An electrically conductive contact between frame 6 and base plate 7 is provided by the spacing boss 20. The frame 6 likewise has a spacing boss 20 with respect to the flange 5 of the hood 2. A gap 21 arising here can also be filled with an adhesive and/or sealant.

Furthermore, the hollow profiles 8 are arranged below the base plate 7 or the cooling duct plate 17 with respect to the vertical direction Z of the motor vehicle. The hollow profiles 8 extend with the course of their hollow chambers 23 in the transverse direction Y of the motor vehicle. The hollow profiles 8 can be coupled to one another via a tongue and groove plug-in system 22. The hollow profiles 8 therefore extensively cover virtually the entire base. The hollow chambers 23 therefore form a space in order to damp impacts coming from below with respect to the vertical direction Z of the motor vehicle in the event of being placed on an underlying surface or to optionally dissipate crash energy which arises, in order to protect the batteries 16 from damage.

FIG. 3 shows a cross-sectional view according to the intersecting line III-III from FIG. 1. The individual batteries 16 which rest on the base plate 7 can also be seen here, wherein heat which arises below the base plate 7 is then removed via cooling ducts 19. The hollow profiles 8 do not run continuously in the transverse direction Y of the motor vehicle, but rather are interrupted by the central profile 9. For example, an exhaust train, not illustrated, of an internal combustion engine can be arranged in the recessed region 10 of the central profile 8. It can be seen in each case that the frame 6 is peripheral on the outside and couples the flange 5 of the hood 2 and the base plate 7 to each other.

FIG. 4 shows an assembly operation for a battery carrier 1 according to the invention. The hollow profiles 8 running in the transverse direction Y of the motor vehicle and the central profile 9 are arranged first. A peripheral frame 6 is then placed thereon. Fastening profiles in the form of receiving blocks 27 for coupling to batteries, not illustrated specifically, are arranged in the frame 6 itself.

FIG. 5 shows a perspective view in a further manufacturing step, wherein the cooling duct plate 17 is placed on here and the formations 18 are arranged therein in the form of lines or in the form of ducts.

FIG. 6 shows the base plate 7 which is arranged thereon and which forms a flat underlying surface for receiving batteries 16, illustrated in FIG. 7. It can be seen that the illustrated battery 16 is coupled to the receiving blocks 27.

FIG. 8 once again shows a sectional view in this respect. The cooling ducts 19 produced between base plate 7 and cooling duct plate 17 and the hollow profiles 8 arranged below the cooling ducts 19 can be seen.

FIG. 9 shows a detailed view. The peripheral frame 6 with its spacing boss 20 protruding at the top and bottom in the vertical direction Z of the motor vehicle can be seen. The gaps 21 arising in-between can be filled with a sealant and/or adhesive, not illustrated specifically. The hollow profiles 8 are screwed to the frame 6 by screws 28 reaching through the base plate 7 and the cooling duct plate 17 from below. A lateral covering plate 54 which closes the hollow profiles 8 laterally can then additionally be arranged here.

FIG. 15 shows a hood 2 in a partial view from below in a region of an arising corner. An opening therefore faces upwards with respect to the image plane. First of all, a sheet-metal blank, not illustrated, has been provided and then the hood 2 produced as a folded component by forming of the sheet-metal blank. For this purpose, the side walls 4 and the flanges 5 are in each case folded or chamfered and then come to lie in the region of the corner 30 according to FIG. 10. However, they are not yet connected. A peripheral side wall 4 is formed by four side walls 4 or side wall portions which each meet in a corner region 29. A flange 5 protrudes laterally peripherally on the outside in relation to the side walls 4.

According to the invention, the trough is designed or produced as a folded trough. FIG. 10 shows one such corner region 29 which has arisen after the folding. It is problematic to tightly weld said corner region 29 and also in particular the lower corner 30, this also applying, as it were, to that part of the flange 5 which protrudes on the outside.

FIG. 11 shows a solution approach according to the invention for this. A weld seam 32 is drawn from the inside, not beginning in the corner 30, but rather beginning with an offset 33 from the corner 30 in a transition region from base 3 to side wall 4, a continuous weld seam 32 over the corner 30 and the corner region 29, said weld seam extending as far as the outer part of the flange 5. The weld seam is produced by means of MIG welding.

FIG. 12 shows a further variant embodiment of the present invention. Here, first of all, that region of the flange 5 of the two side walls 4 that protrudes on the outside is extended outwards or formed to protrude further in the region of the corner connection. The weld seam 32 is then drawn as far as the outer end 34 of the flanges 5 protruding further to the outside.

Subsequently, the flange 5 according to FIGS. 13*a* and 13*b* is mechanically processed along an intersecting line 35 by separation or another abrasive or mechanical method, thus resulting in a smooth outer peripheral edge 36 of the flange 5 which has a high quality of connection specifically even in the region of the weld seam of the flange 5. Weld seam errors at the beginning and end of the welding operation are therefore avoided according to the invention.

FIG. 14 shows a supplementary variant embodiment. Here, in addition to the weld seam 32, a sealing bead 37 is additionally applied from the inside at least in a longitudinal section.

FIG. 16 shows a further variant embodiment of an independent inventive concept. A hood 2 of a battery carrier 1 is illustrated here. Said hood is likewise produced as a folded component and has a base 3 and a peripheral side wall 4. The side wall 4 has four sides or side wall portions which are joined together in a respective corner region 29 after the folding operation. According to the invention, an additional step 38 is in each case now formed on two opposite side walls 4, on the left and right with respect to the image plane. This can readily also be seen once again in the sectional illustration according to the intersecting line A-A in FIG. 17. The step 38 makes it possible to provide an option for battery modules to be fitted in the hood 2 or trough. Furthermore, the step 38 stiffens the corresponding side wall 4.

FIG. 18 shows a further variant embodiment of the present invention. The step 38 is formed here on three sides of the peripheral side wall 4. Self-piercing nuts 39 are arranged on the step 38 or are introduced into the latter such that batteries or battery modules, not illustrated specifically in FIG. 18, can be fastened in the trough or hood 2.

FIGS. 19a to 19f show various cross-sectional views of the peripheral frame 6. FIG. 19a shows the frame 6 in a cross-sectional view. Spacing bosses 20 arranged both at the top and bottom can be seen. The spacing bosses 20 may also be referred to as the shield edge. This therefore results in an impact surface 40 which lies on the outside and is oriented in the transverse or longitudinal direction X, Y of the motor vehicle such that it enters into contact with an impacting object first. Predetermined buckling points 43 are formed in an upper flange 41 and a lower flange 42. The predetermined buckling points 43 indicate a corresponding deformation here. A groove 45 and a tongue 46 can optionally be formed on an upright flange 44 arranged with respect to an inner region of the battery tray. A further spacing boss, not illustrated specifically, could also be formed here. In particular, the frame or the profile for producing the frame is produced by extrusion.

Figure 19:
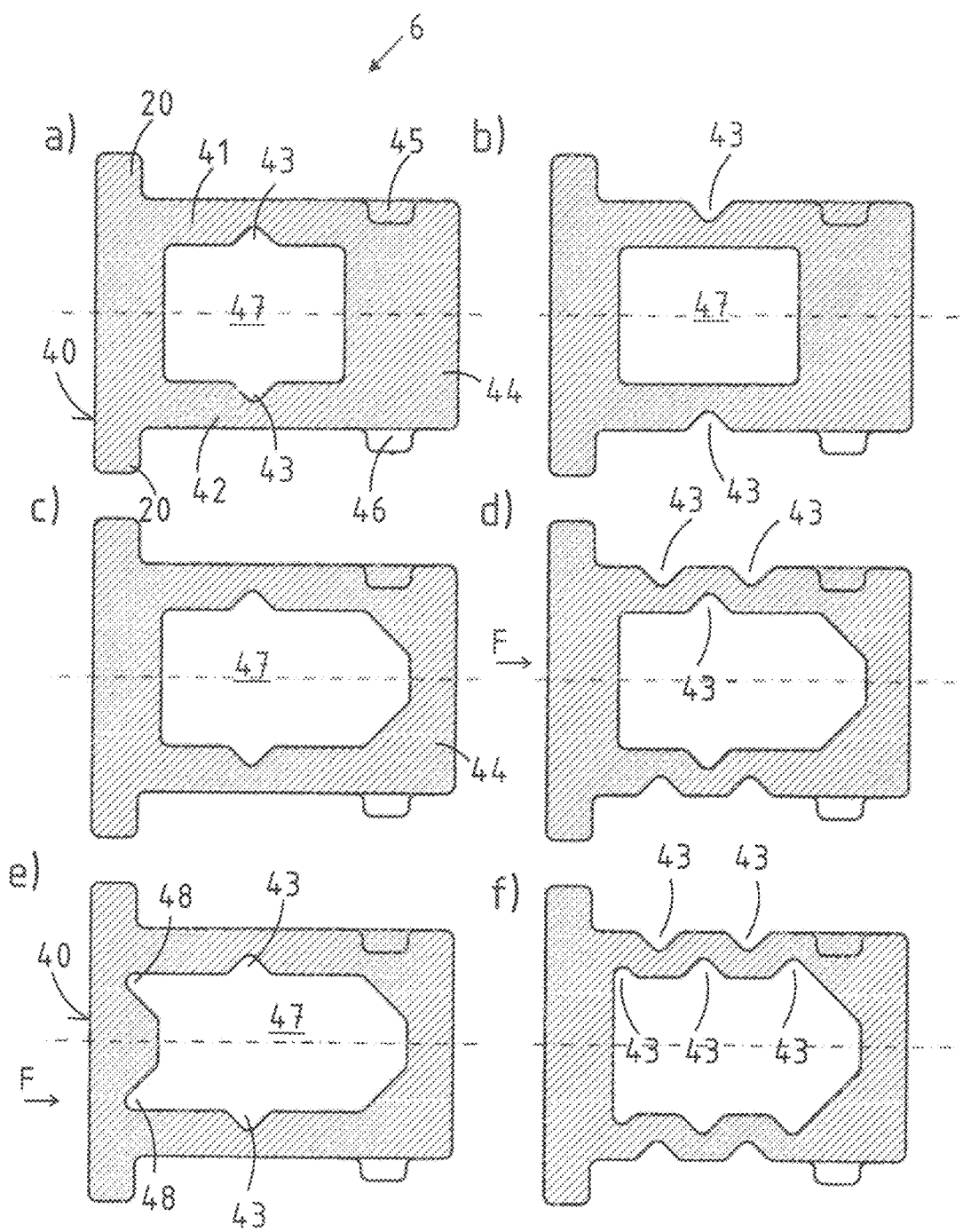
FIG. 19b shows an alternative variant embodiment in which the predetermined buckling points 43 are not arranged in the region of an inner hollow chamber 47, but rather are arranged on the outside.
FIG. 19c shows an alternative in which the hollow chamber 47 is larger and the solidity of the upright flange 44 is smaller.

FIG. 19d shows an alternative variant embodiment with three hollow chambers 47 arranged in each upper flange 41 and lower flange 42. Two hollow chambers are arranged on the outside and one hollow chamber 47 is arranged on the inside. The hollow chambers 47 therefore serve as a trigger in the event of an impact in the force direction F, in order to permit a targeted deformation or folding.

According to the variant embodiment of FIG. 19e, the hollow chamber 47 is furthermore designed in such a manner that two points 48 extend in the direction of the impact surface 40 with a point 48 arranged in each case at the top and bottom in the direction of the impact surface 40. A targeted deformation in the event of an impact in the force direction F can thereby also be influenced.

FIG. 19f shows an alternative variant embodiment in which a total of five predetermined buckling points 43 are introduced into in each case the upper flange 41 and lower flange 42. The folding behavior can thereby be influenced in a targeted manner. The frame 6 therefore operates according to the principle of a crash box, in particular when objects intrude laterally into the battery tray.

Figure 20:
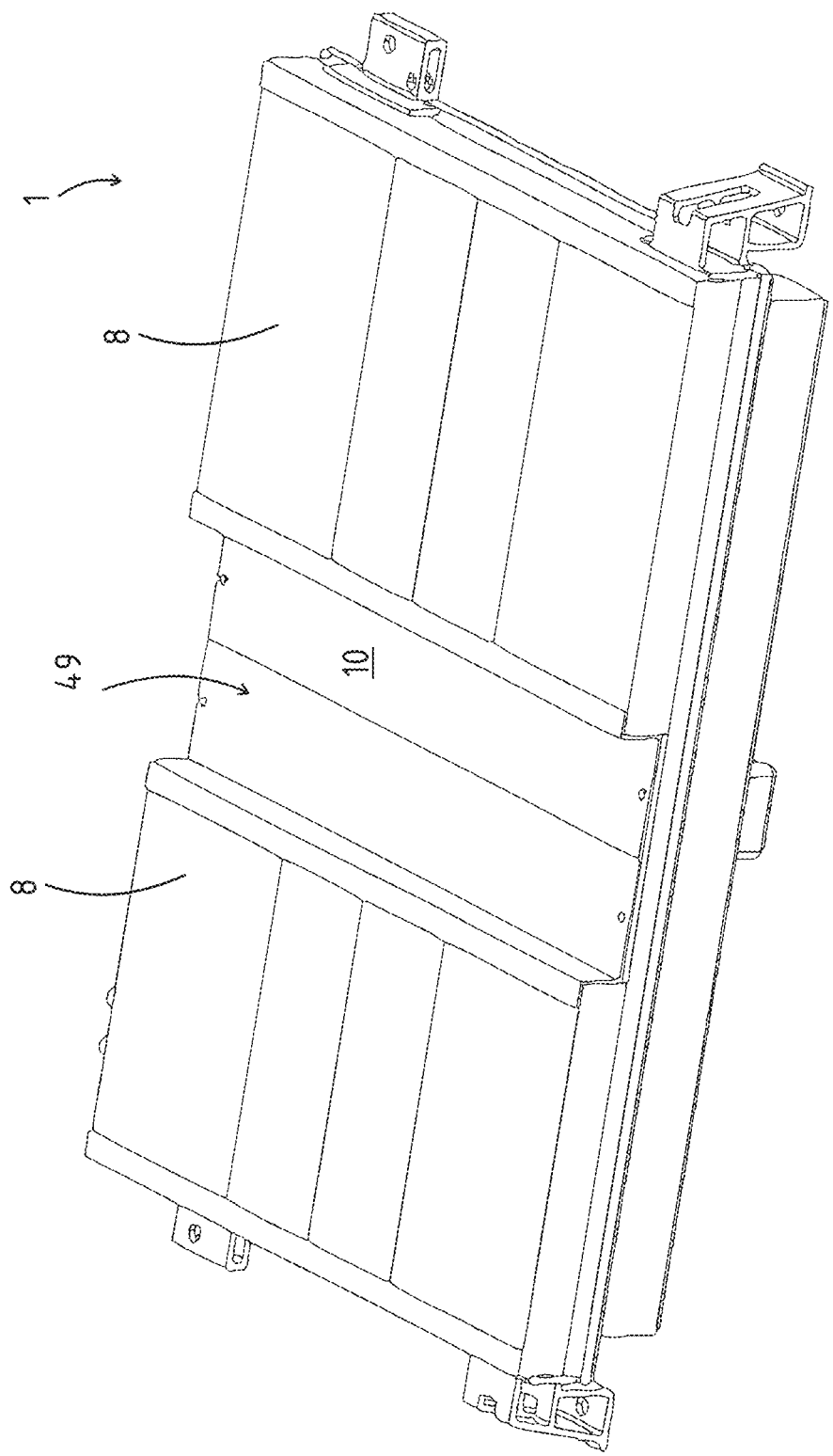

FIG. 20 shows the overall system of the battery carrier from below. An exhaust train, not illustrated specifically, can therefore be guided in the recessed region 10, which may also be referred to as the central tunnel 49.

Figure 21:
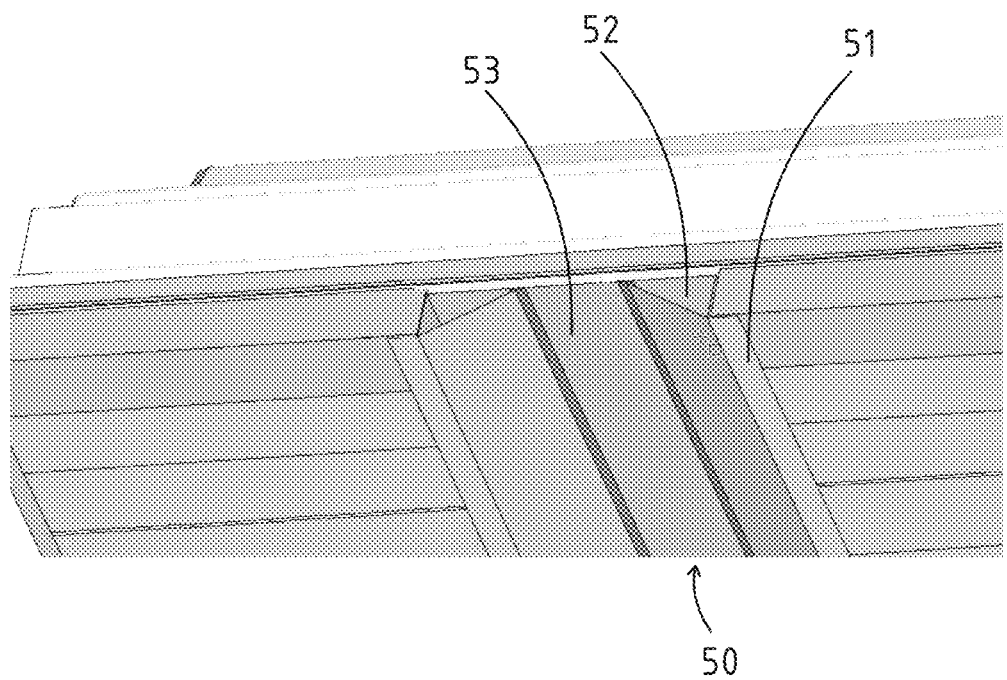

According to FIG. 21, a heat protection plate 50 is arranged in said central tunnel 49. The heat protection plate 50 itself engages with a flange 51 over the respective hollow chambers 8. The heat protection plate 50 is then formed in the region of the central tunnel 49 by two cross-sectionally triangular hollow chambers 52 and a web 53 connecting the latter in the center. The heat protection plate 50 is designed in particular as an extruded component. For this purpose, the web 53 preferably has a wall thickness of between 4 mm and 5 mm, in particular 4.5 mm, the triangular hollow chambers 52 have a wall thickness in the range of 3.5 mm to 4.5 mm, in particular 4 mm, and the flange 51 has a wall thickness of 2.5 mm to 3.5 mm, in particular 3 mm. The heat protection plate 50 therefore serves at the same time as a load path in the transverse direction Y of the motor vehicle.

FIG. 22 shows a trough 55 according to the invention. The trough 55 has a base plate 56 and a peripheral side wall 4. Side wall 4 and base plate 56 are produced integrally and from the same material by cutting out a blank and subsequently folding the blank. The front side 4v of the side wall 4 and rear side 4h of the side wall 4, with respect to the image plane, are each smooth per se. The left side 4l of the side wall 4 and the right side 4r of the side wall 4, with respect to the image plane, are formed with an additional step 57. The step 57 is formed and serves as a supporting surface for battery modules arranged in the trough 55 and/or for additional stiffening. The front side 4v of the side wall 4 is folded upwards in a following manufacturing step and then welded to the side 4l and 4r in the arising corner regions. A bending region 58 between base plate 56 and side wall 4 is furthermore illustrated. Said bending region is produced according to the invention with a particularly small bending radius with respect to the thickness or wall thickness W of the sheet-metal blank. This is possible because of the folding technique.

Figure 1:
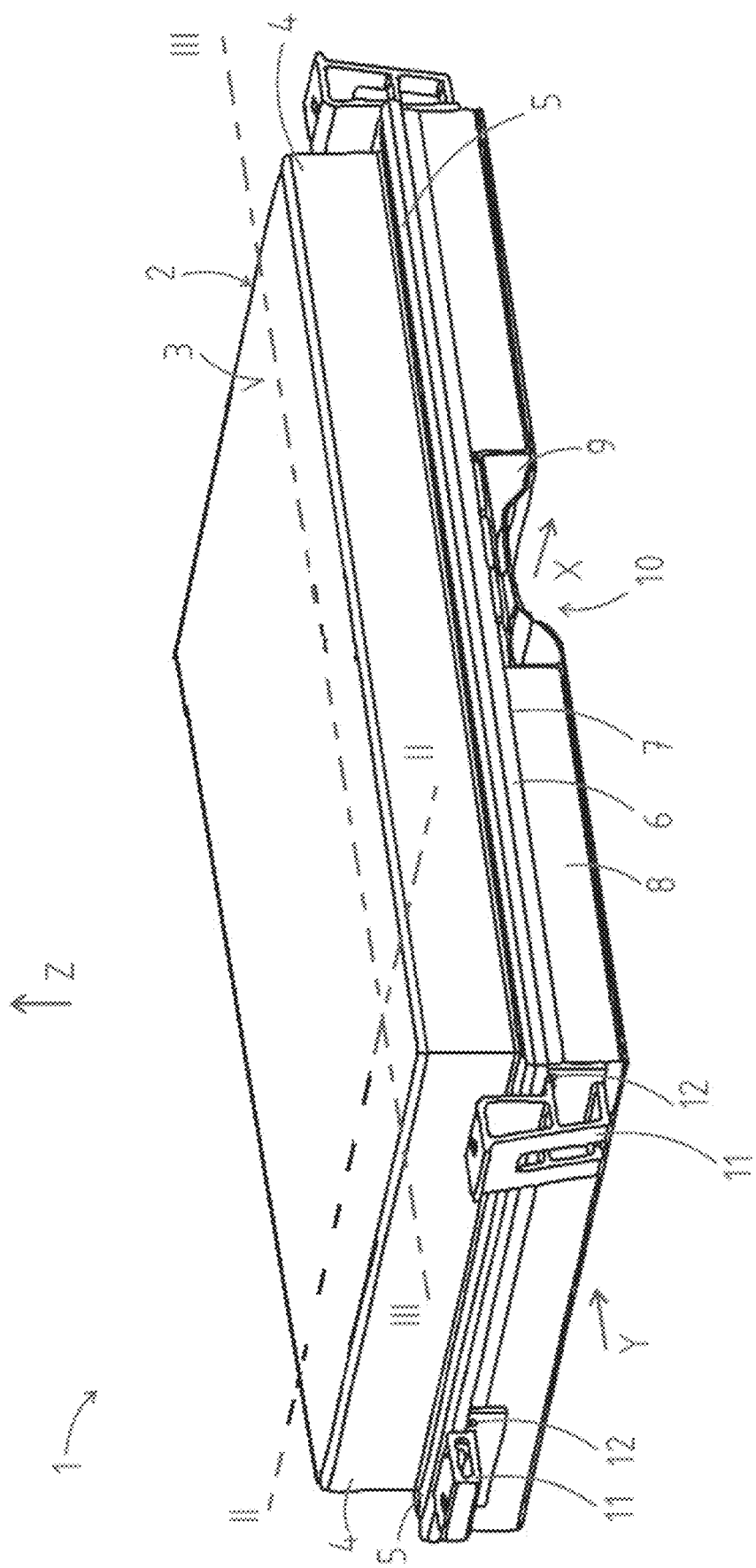
Figure 2:
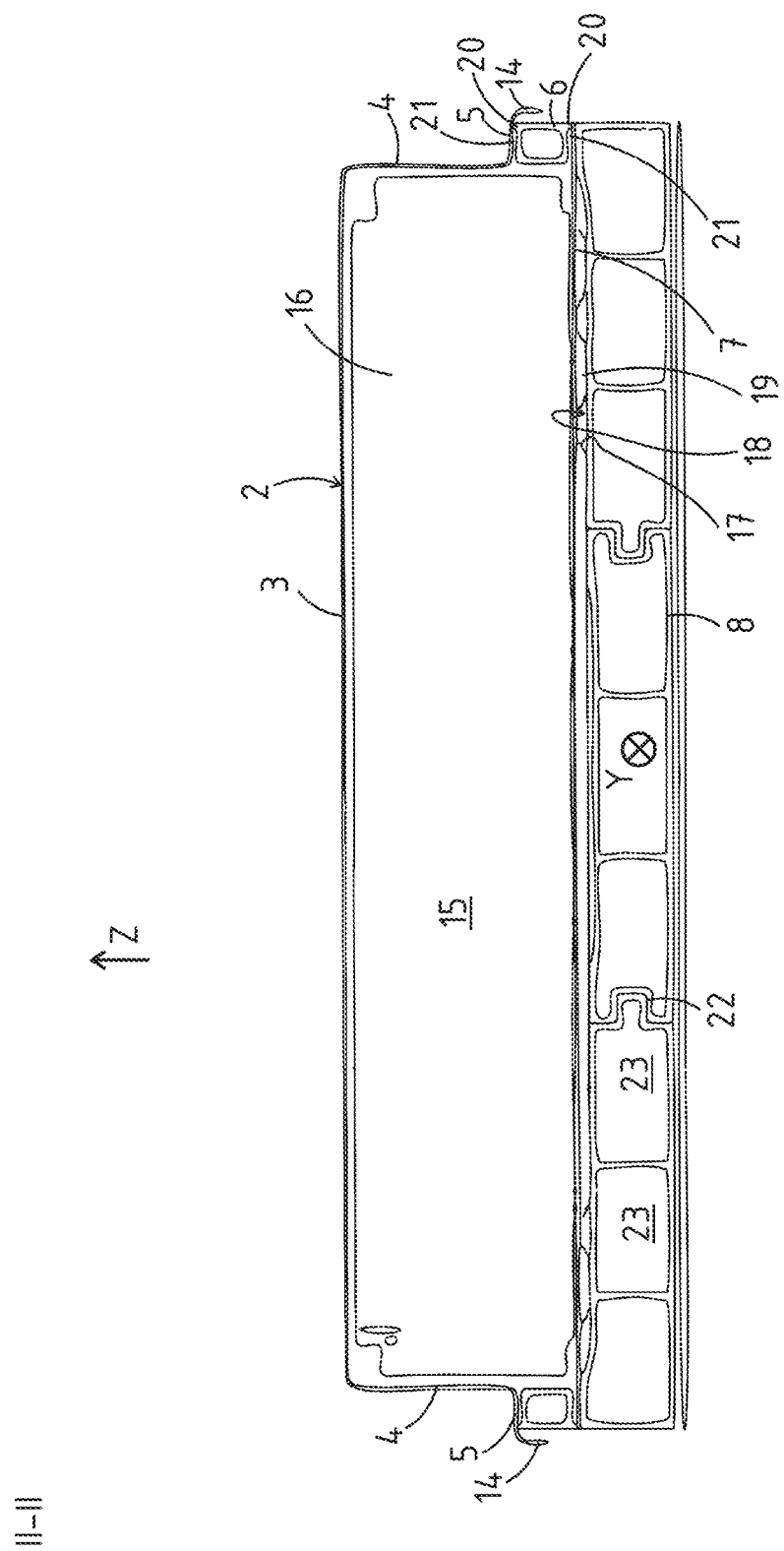
Figure 3:
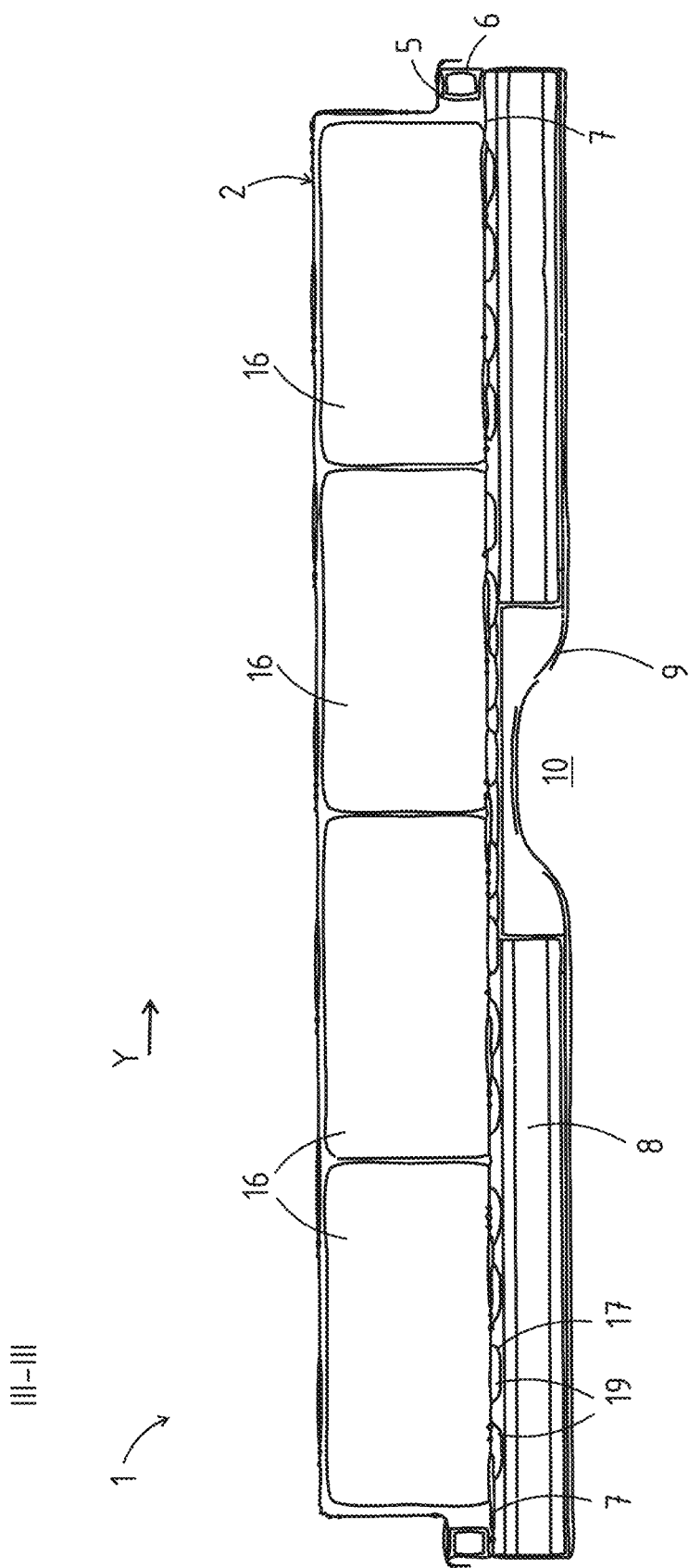
Figure 4:
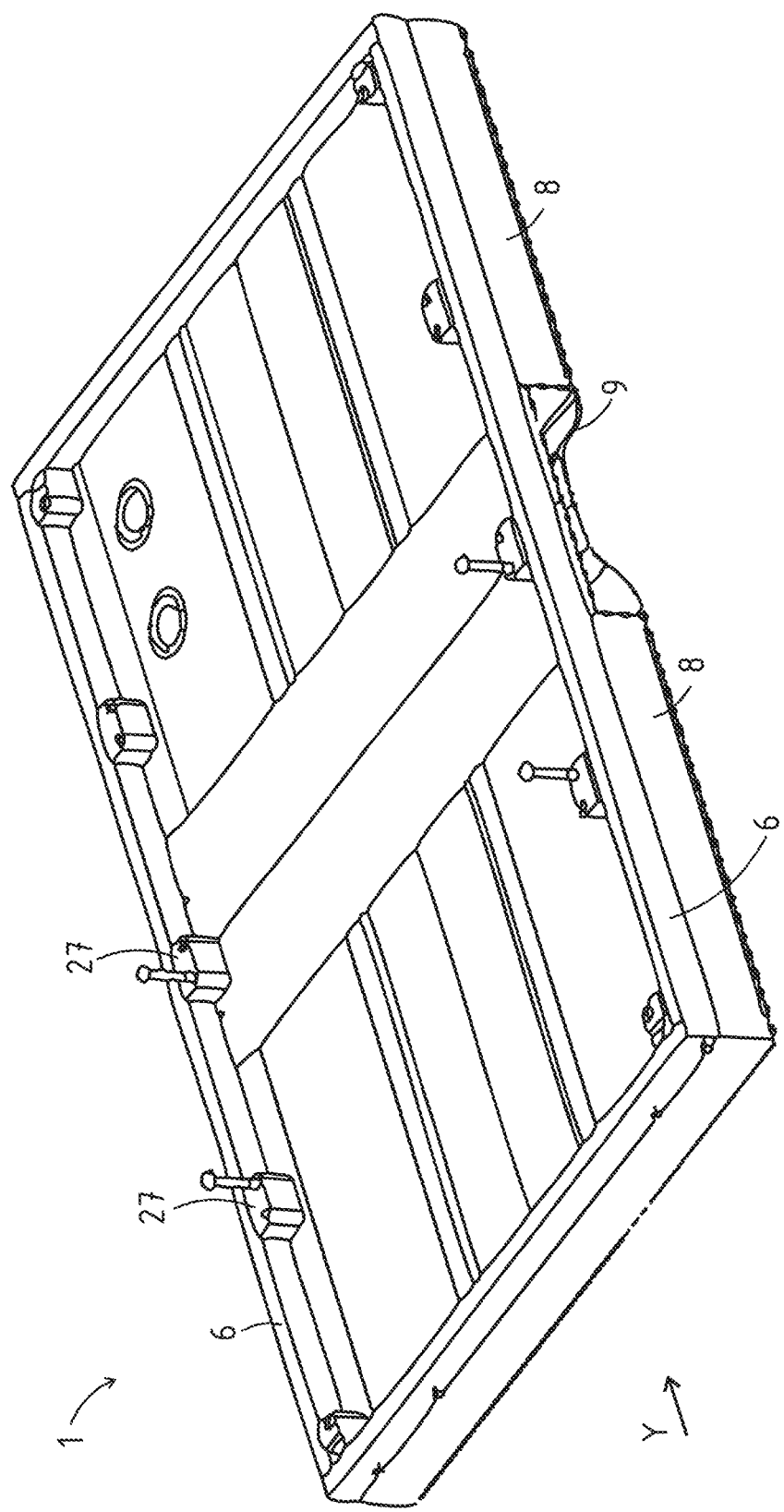
Figure 5:
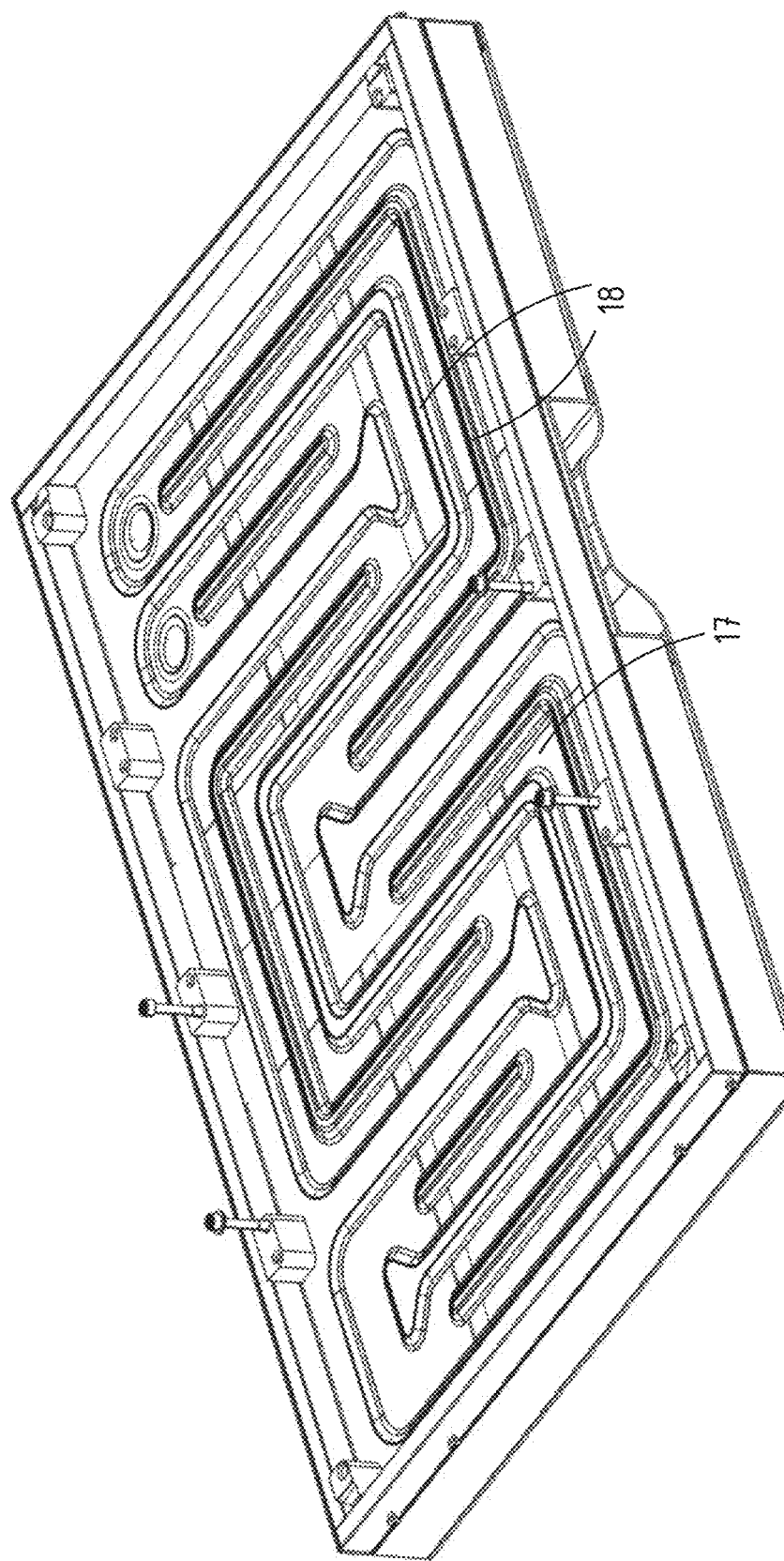
Figure 6:
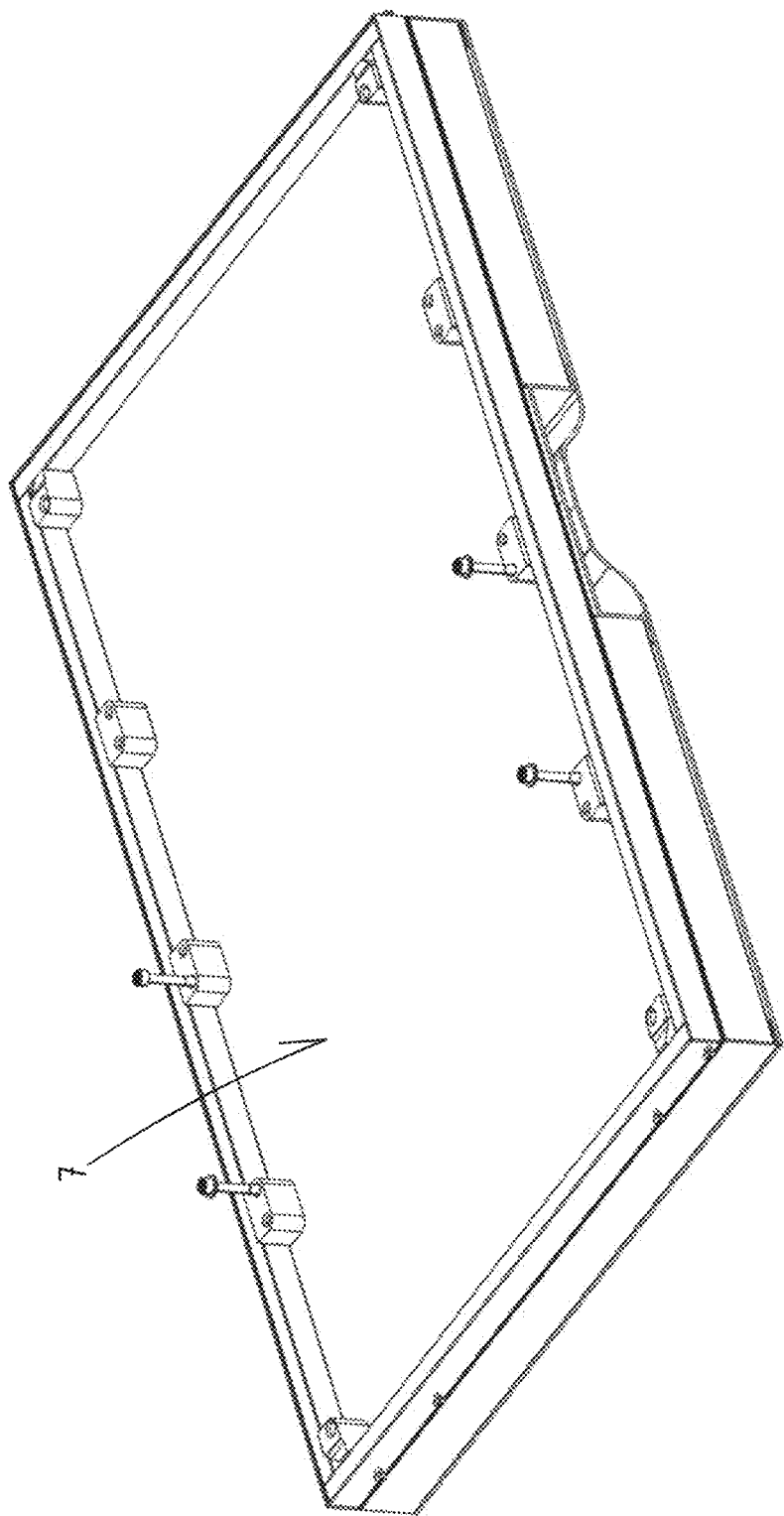
Figure 7:
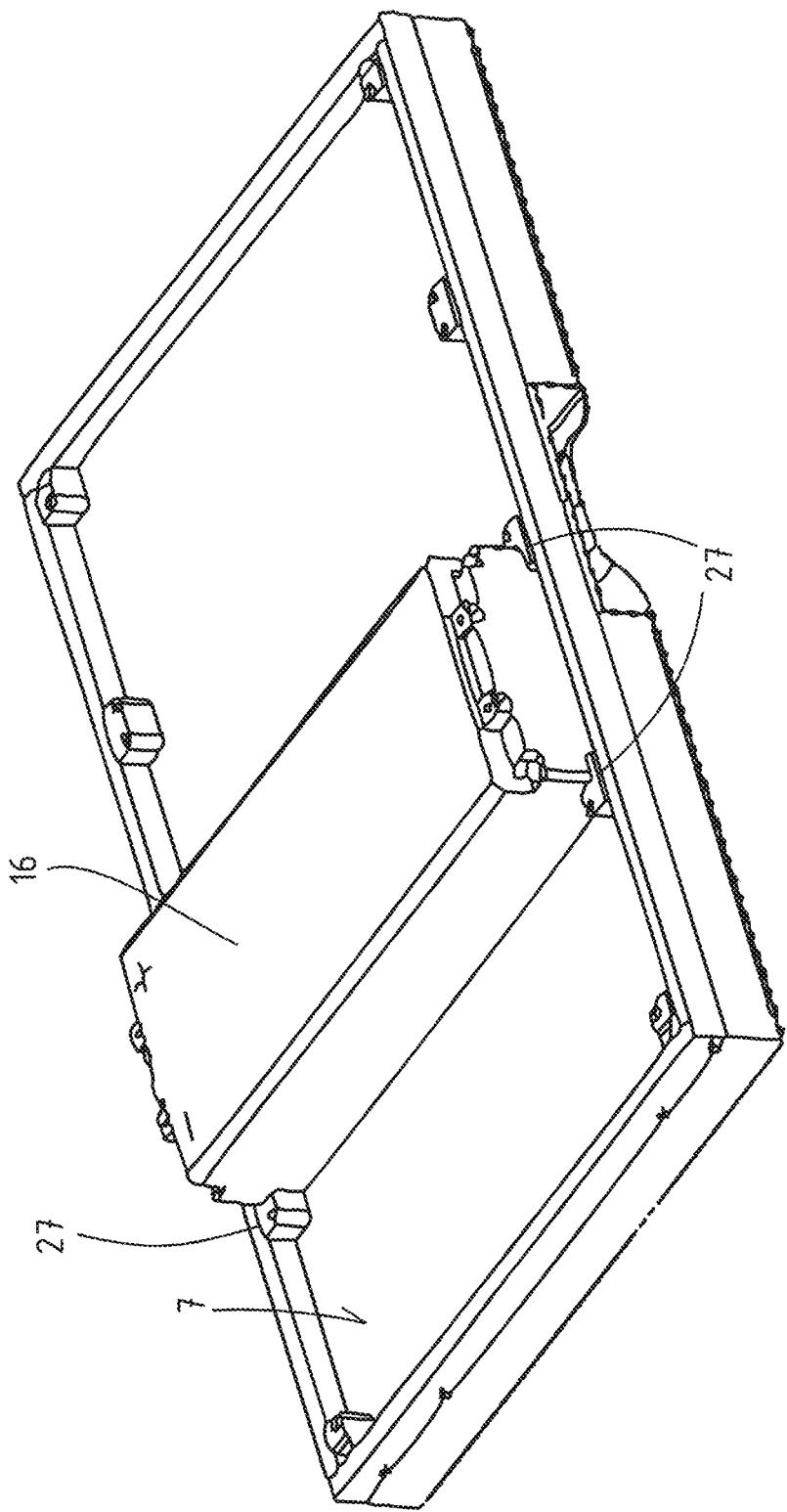
Figure 8:
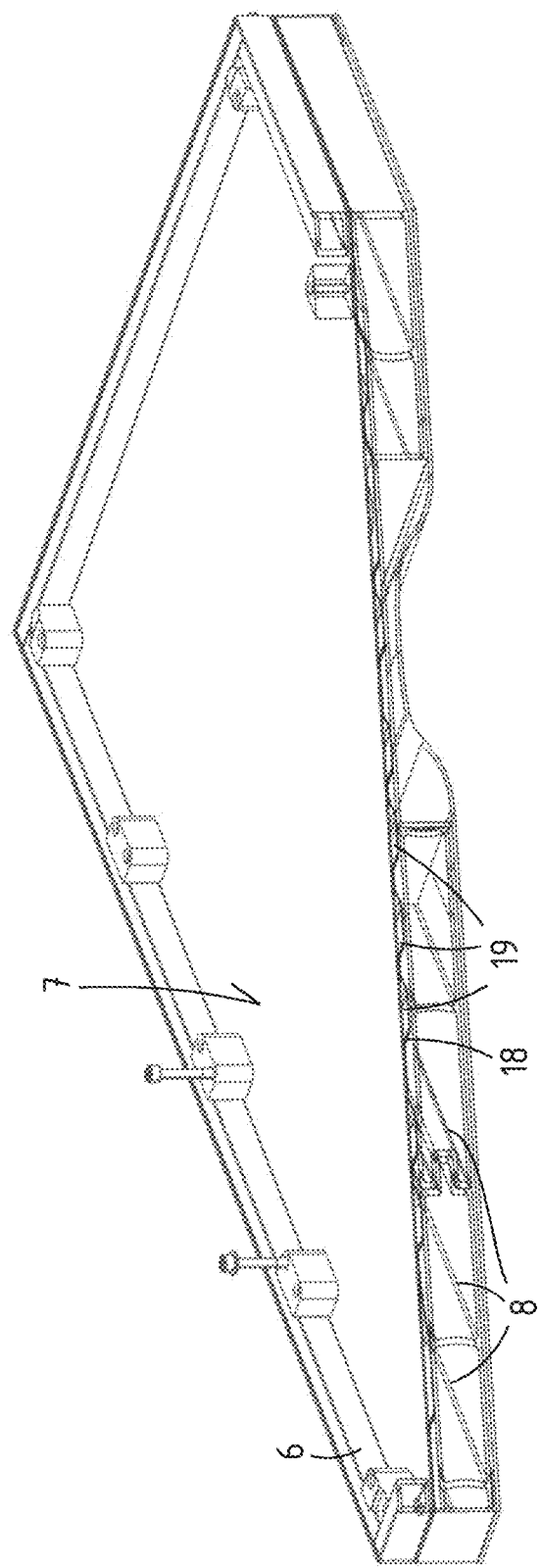
Figure 9:
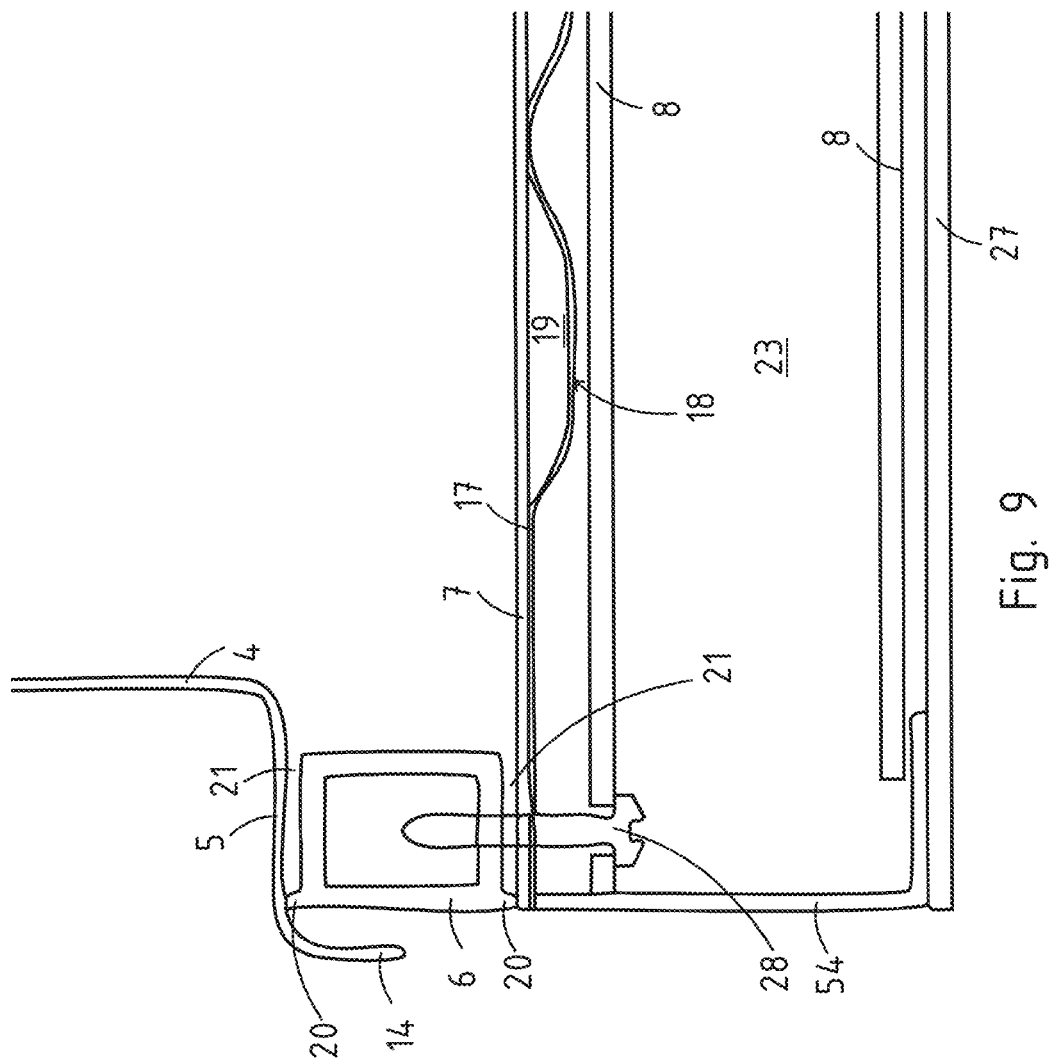
Figure 10:
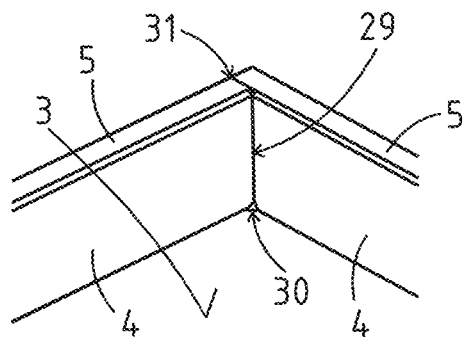
Figure 11:
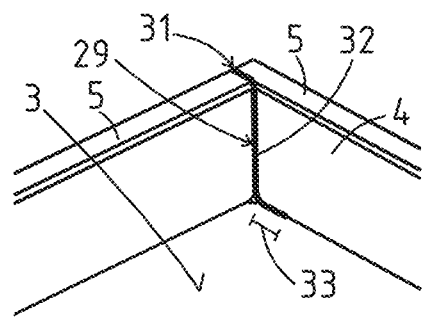
Figure 12:
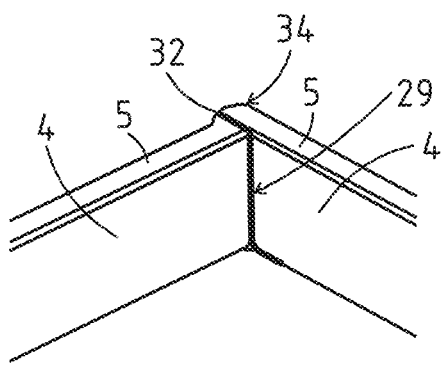
Figure 13A:
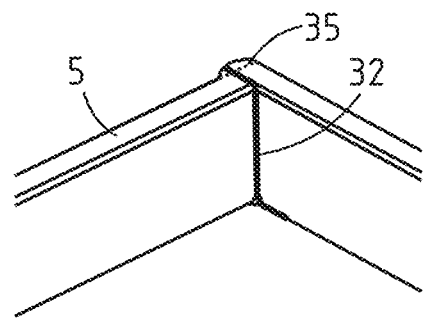
Figure 13B:
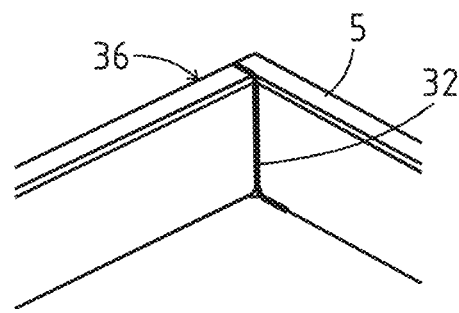
Figure 14:
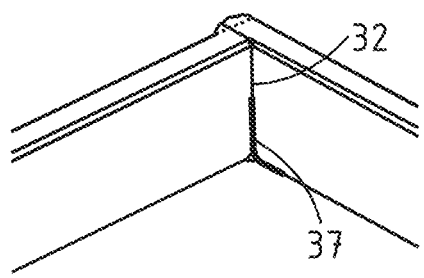
Figure 15:
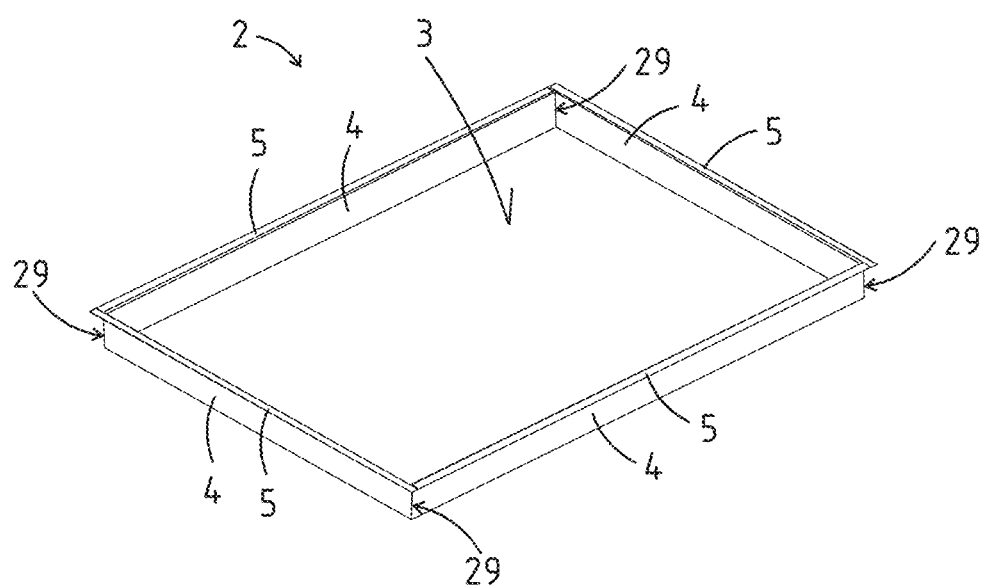
Figure 16:
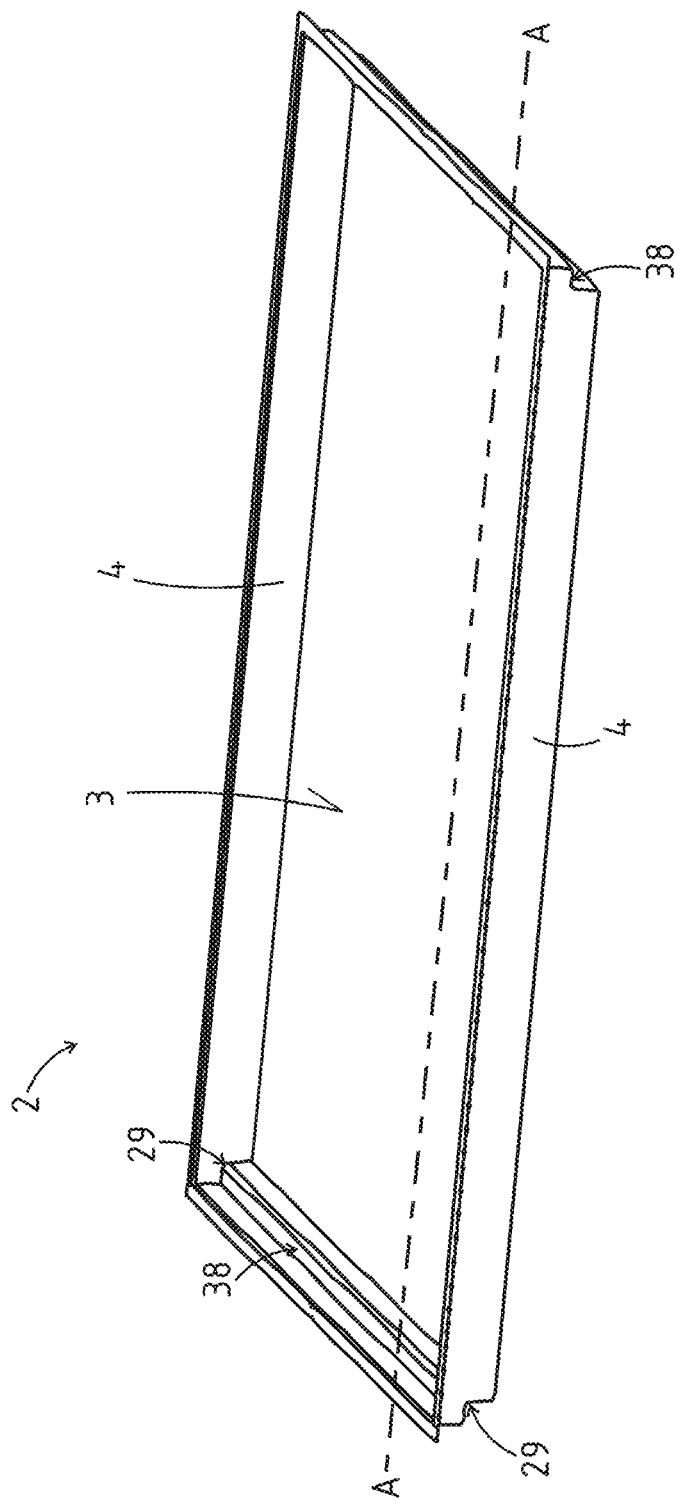
Figure 17:
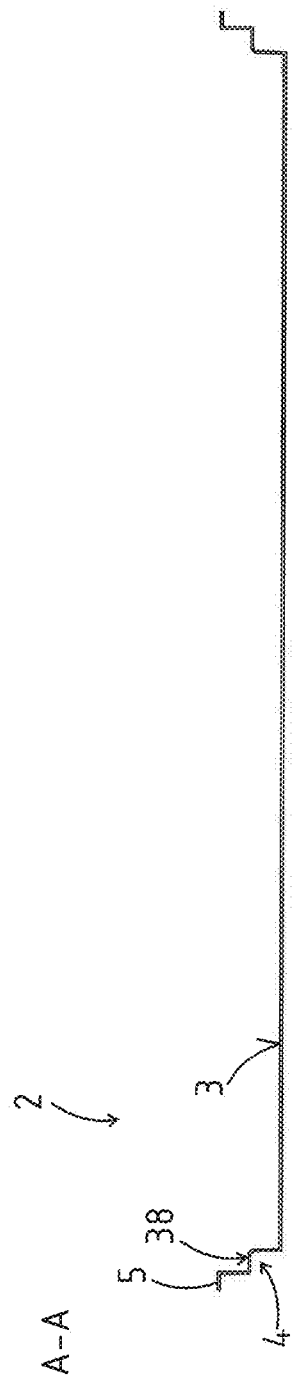
Figure 18:
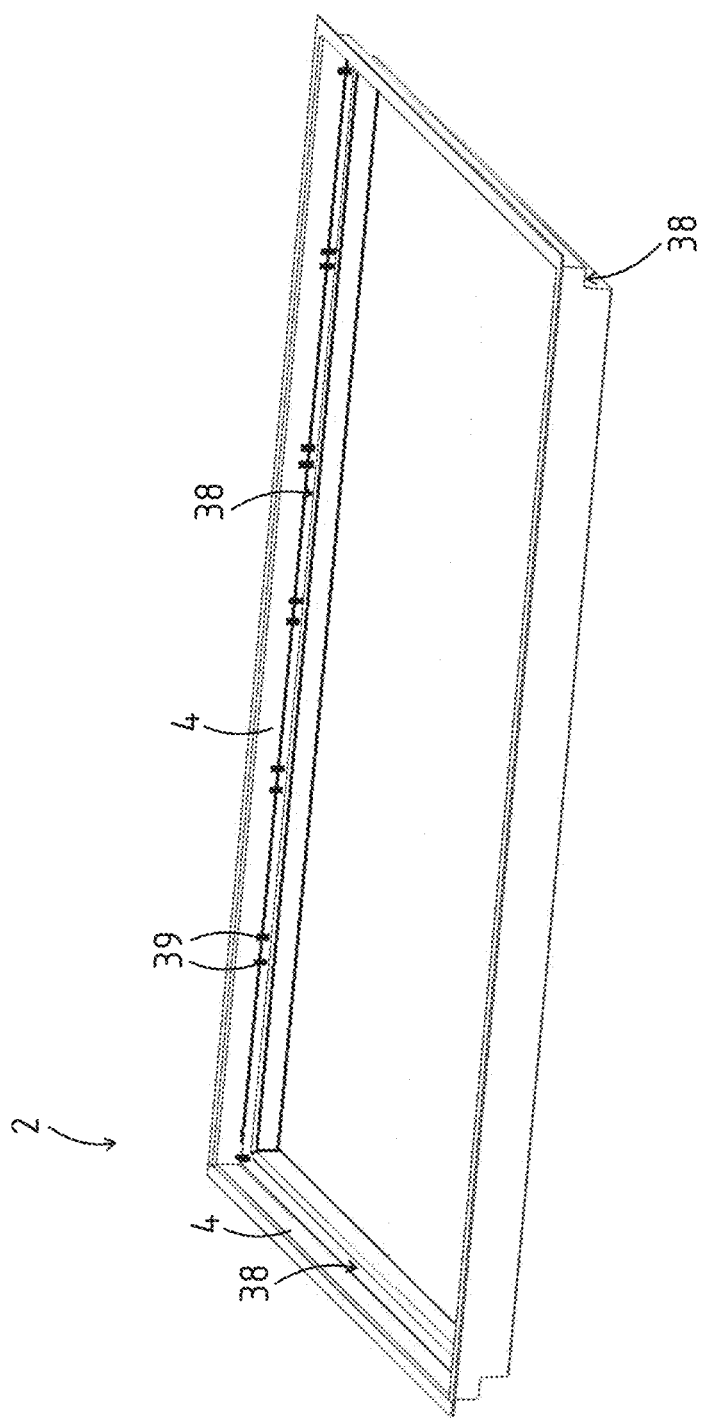

The trough 55 illustrated here can also be used as a hood in the exemplary embodiment according to FIG. 1. In this case, it is furthermore conceivable for the steps to stiffen the hood itself and, in the mounted state, also the battery carrier. The hollow profiles of the frame 3 could therefore be lighter and/or thinner or could even be entirely omitted.

The invention claimed is:

1. Battery carrier for an electric motor vehicle, having a trough formed by a base and a peripheral frame coupled to the base, wherein the frame is formed from extruded or roll-formed hollow profiles and a cover is arranged on the frame, wherein, in the installation position, the frame has a web protruding in each case in relation to its upper side or lower side in such a manner that a defined gap with respect to the base or with respect to the cover is produced, with a sealant or adhesive being incorporated.

2. Battery carrier according to claim 1, wherein a base plate is provided, with a cooling system arranged therebelow in the installation direction.

3. Battery carrier according to claim 2, wherein a cooling duct plate is arranged below the base plate in such a manner that a cooling duct system is formed between base plate and cooling duct plate.

4. Battery carrier according to claim 2, wherein hollow profiles running transversely with respect to the direction of travel are arranged below the base plate.

5. Battery carrier according to claim 1, wherein a cover is arranged on the frame, wherein the cover has a peripheral flange and rests with the flange on the frame.

6. Battery carrier according to claim 5, wherein the flange of the cover has a collar or step which engages downwards around the frame and with which the flange engages over the frame.

7. Battery carrier according to claim 1, wherein the frame is welded tightly together in the corner regions by a peripheral weld seam.

8. Battery carrier according to claim 1, wherein the frame profiles are tightly joined at least in a corner by electric resistance fusion welding.

9. Battery carrier according to claim 1, wherein two adjacent frame profiles have a notch in at least one corner region in such a manner that two frame profiles engage in each other in the corner region and the outer wall of one of the frame profiles closes an end side of the other frame profile.

10. Battery carrier according to claim 1, wherein two adjacent frame profiles have a miter cut in a corner region in such a manner that two end sides of the frame profiles butt against each other.

11. Battery carrier according to claim 1, wherein mounting holders for coupling to batteries are arranged in the frame or on an inner side of the frame.

12. Battery carrier according to claim 1, wherein the base plate and optionally the cooling duct plate are reached through from below by a screw bolt, wherein the screw bolt is screwed into the hollow profile of the frame.

13. Battery carrier according to claim 1, wherein the frame in cross section has grooves or predetermined buckling points in such a manner that the frame acts as a crash box during a side impact.

14. Battery carrier according to claim 2, wherein hollow profiles running transversely with respect to the direction of travel are arranged below the cooling duct plate.

15. Battery carrier according to claim 1, wherein the frame profiles are tightly joined at least in a corner by resistance pressure welding.

16. Battery carrier according to claim 1, wherein the frame profiles are tightly joined at least in a corner by flash butt welding.

* * * * *